United States Patent [19]

Hildebrand et al.

[11] Patent Number: 4,702,155

[45] Date of Patent: Oct. 27, 1987

[54] AIR GUIDE ASSEMBLY IN AUTOMOTIVE VENTILATING SYSTEM

[75] Inventors: Reinhard Hildebrand, Redwitz; Djuanarto-Adi Kusuma, Dörfles Esbach, both of Fed. Rep. of Germany

[73] Assignee: Siemens Aktiengesellschaft, Munich, Fed. Rep. of Germany

[21] Appl. No.: 835,469

[22] Filed: Mar. 3, 1986

[30] Foreign Application Priority Data

May 21, 1985 [DE] Fed. Rep. of Germany ....... 3510278

[51] Int. Cl.⁴ ............................................. F24F 13/14
[52] U.S. Cl. .......................................... 98/2; 98/40.28
[58] Field of Search ...................... 98/2, 40.12, 40.13, 98/40.18, 40.24, 40.28

[56] References Cited

U.S. PATENT DOCUMENTS

| 2,646,741 | 7/1953 | Castle | 98/40.24 |
| 2,928,333 | 3/1960 | Madison | 98/40.28 |
| 3,138,085 | 6/1964 | Mitchell | 98/2 X |
| 3,254,587 | 6/1966 | Sweeney | 98/40.12 |
| 3,802,328 | 4/1974 | Kakizaki | 98/2 |

FOREIGN PATENT DOCUMENTS

| 1430300 | 3/1969 | Fed. Rep. of Germany | 98/2 |
| 1432145 | 4/1976 | United Kingdom | 98/40.28 |

Primary Examiner—Harold Joyce
Attorney, Agent, or Firm—Kenyon & Kenyon

[57] ABSTRACT

An air guide assembly in the ventilating system of an automotive vehicle comprises an integral air guide element with a multiplicity of air deflection fins, the air guide element being rotatably mounted by means of a ball and socket joint to a housing. The housing is insertable in a sleeve-like receiving element on a dashboard panel.

11 Claims, 4 Drawing Figures

AIR GUIDE ASSEMBLY IN AUTOMOTIVE VENTILATING SYSTEM

BACKGROUND OF THE INVENTION

This invention relates to a ventilating system of automotive vehicle and, particularly, to an assembly therein for conrolling the direction of air flow into a passenger compartment of the vehicle.

Air flow guide assemblies of this type are found predominantly at the dashboards of motor vehicles and generally include respective housing elements and ventilating grills consisting of a synthetic resin material. The ventilating grill comprises several slats snapped into a frame. In order to enable a change in the direction of air flow, the individual slats are coupled to each other by a connecting rod.

For ventilating air flow guide assemblies of this type, installation costs are high and the number of tools required for installation are numerous. Moreover, when the grill is turned, the slats thereof frequently project beyond the housing into the passenger compartment of the vehicle.

An object of the present invention is to provide an improved air flow guide assembly of the above-described type.

Another object of the present invention is to provide such an air flow guide assembly in which the number of parts is reduced without adversely affecting the operation of the ventilating system.

Yet another object of the present invention is to provide such an air flow guide assebly in which manufacturing and installation costs are decreased.

An additional object of the present invention is to provide such an air flow guide assembly which provides enhanced safety for passengers in the automotive vehicle.

Another, more particular, object of the present invention is to provide such an air flow guide assembly in which air deflection components never project beyond the housing of the assembly.

SUMMARY OF THE INVENTION

The present invention is directed to an assembly installable in the ventilating system of an automotive vehicle for adjustably controlling the direction of air flow into the passenger compartment of the vehicle. In accordance with the invention, the assembly comprises a housing, a integral air guide element, and a coupling mechanism for rotatably connecting the air guide element to the housing. The housing has an air inlet end and an air outlet end, the housing defining a direction of inflowing air extending from the inlet end towards the outlet end. The air flow guide element is disposed in the housing and includes a multiplicity of air deflection components such as guide fins rigidly connected to one another. The coupling mechanism includes, in accordance with the invention, a ball and socket joint. The ball member is preferably integral with the housing, while the socket member is integral with the air guide element.

The assembly advantageously further comprises an actuator lever manipulatable by an operator for facilitating a pivoting of the guide element to change a direction of outflowing air at the outlet end of the housing.

In accordance with another particular feature of the present invention, the assembly further comprises a dashboard panel having a multiplicity of stationary ribs spaced from one another to form a grid. The housing is mounted to the dashboard panel. The ribs of the panel are preferably disposed substantially in a common plane, while the air guide element is spaced from that plane.

In accordance with another particular feature of the present invention, the dashboard panel is provided with a mounting element for receiving the housing, the mounting element having a diverging mouth at an outlet end.

All of the elements of the air guide assembly in accordance with the invention are advantageously made of a synthetic resin material.

An air guide assembly pursuant to the invention has a small number of parts and is easily assembled. The conventional slats and corresponding connecting rod are eliminated.

Due to the ball and socket support, the air flow guide element can be adjusted in all directions. Due to the diverging mouth of the mounting element on the dashboard panel, the largest possible angle of air flow into the passenger compartment of the motor vehicle is increased.

DETAILED DESCRIPTION

Figure 1:
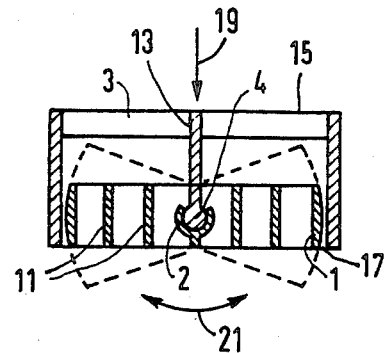
FIG. 1 is a cross-sectional view of an air guide assembly in accordance with the present invention.

As illustrated in FIG. 1, an air flow guide assembly for installation or inclusion in the ventilating system of an automotive vehicle comprises an integral ventilating grill or air guide element 1 which includes a multiplicity of air deflection fins 11. Fins 11 are parallel to and spaced from one another.

Air guide element 1 is provided with a socket member 2 which receives, in a snap lock fit, a ball 4 located at the end of an elongate bracket 13 integral with a housing 3. Bracket 13 is connected to housing 3 at an inlet end 15 thereof, while air guide element 1 is disposed in housing 3 at an outlet end 17 thereof. Inlet end 15 and outlet end 17 define a direction (arrow 19) of inflowing air.

Due to the connection of integral air flow guide element 1 to housing 3 by means of ball member 4 and socket member 2, the air guide element is free to pivot about virtually any axis extending through the center of ball 4. In particular, as indicated by a double-headed arrow 21 in FIGS. 1–3, air guide element 1 is pivotable about an axis extending substantially perpendicularly to the direction of inflowing air indicated by arrow 19. The pivotability of air guide element 1 enables an operator to change the direction of outflowing air issuing from an air flow guide assembly in accordance with the invention.

Figure 2:
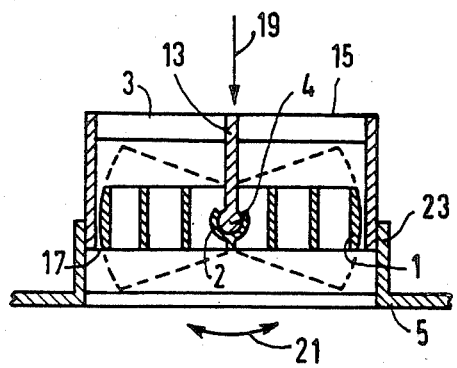
FIG. 2 is a cross-sectional view similar to FIG. 1, additionally showing a dashboard panel as part of the assembly.

As illustrated in FIG. 2, housing 3 is mountable to a dashboard panel 5 in a automotive vehicle by inserting the outlet end of the housing into a sleeve element 23 integral with dashboard panel 5.

Figure 3:
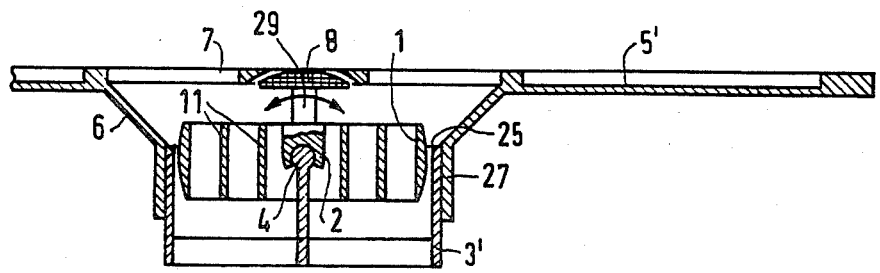
FIG. 3 is a cross-sectional view similar to FIGS. 1 and 2, showing additional features not illustrated in those figures.

As shown in FIG. 3, air guide element 1 may be rotatably mounted in a housing 3' such that a downstream end of the air guide element projects beyond an outlet end 25 of housing 3'. Housing 3' is mounted to a dashboard panel 5' by inserting the outlet end of housing 3' into a sleeve-shaped receiving element 27 integral with dashboard panel 5'. The sleeve-shaped receiving element 27 is formed at an outlet end, i.e., at dashboard panel 5', with a diverging mouth portion 6, whereby the maximum angle of air flow into the passenger compartment of an automotive vehicle is increased.

Figure 4:
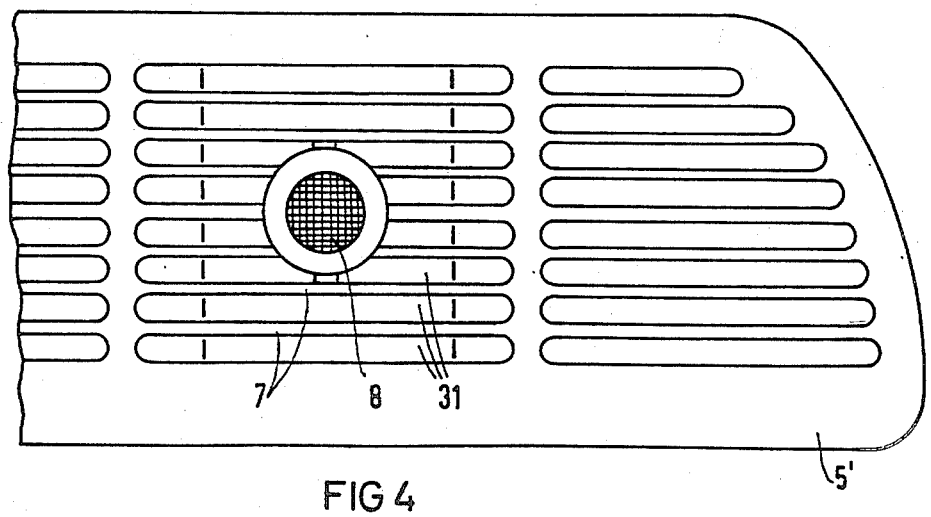
FIG. 4 is a front elevational view of the assembly illustrated in FIG. 3 taken from the top of that figure.

Air flow guide element 1 is advantageously provided with an actuator lever 29 having a manipulatable knob 8 at an end of the lever opposite air guide element 1. As illustrated in FIGS. 3 and 4, dashboard panel 5 includes a multiplicity of elongate ribs 7 spaced from one another by a multiplicity of air gaps to define a grid. Ribs 7 are located substantially in a common plane (the plane of the paper in FIG. 4), actuator lever knob 8 being disposed in that plane.

It is to be noted that air guide element 1 is spaced from the plane defined by ribs 7 so that a rotation of the guide element does not result in the projection of the individual fins 11 thereof beyond dashboard 5 or 5'.

The components of an air guide assembly in accordance with the invention, e.g., air guide element 1, socket member 2, housing 3 or 3', and ball member 4 are advantageously made of a synthetic resin or thermoplastic material such as acrylnitrilbutadiene-styrene copolymers (ABS), polyphenylene-oxide (PPO) and, preferably, acrylnitril-butadiene-styrene polycarbonate blends.

Although the invention has been described in terms of particular embodiments and modifications, one of ordinary skill in the art, in light of this teaching, can generate additional embodiments and modifications without departing from the spirit of or exceeding the scope of the claimed invention. Accordingly, it is to be understood that the descriptions and illustrations herein are proffered by way of example to facilitate comprehension of the invention and should not be construed to limit the scope thereof.

What is claimed is:

1. In a ventilating system of an automotive vehicle, an assembly for adjustably controlling the direction of air flow into a passenger compartment of said vehicle, said assembly comprising:
   a housing having an air inlet end and an air outlet end, said housing defining a direction of inflowing air extending from said inlet end towards said outlet end;
   an integral air guide element including a multiplicity of air deflection components rigidly connected to one another, said air guide element being disposed in said housing; and
   coupling means for rotatably connecting said air guide element to said housing, said coupling means including a ball and socket joint disposed at a geometrical center of said guide element, said guide element being mounted to said housing in a snap lock by means of said ball and socket joint.

2. The assembly defined in claim 1 wherein said ball and socket joint includes a ball member integral with said housing and a socket member integral with said air guide element.

3. The assembly defined in claim 2 further comprising a dashboard panel having a multiplicity of stationary ribs spaced from one another to form a grid, said housing being mounted to said dashboard panel.

4. The assembly defined in claim 3 wherein said dashboard panel is provided with mounting means for receiving said housing, said mounting means having an additional inlet end and an additional outlet end, said mounting means having in a region about said additional outlet end a mouth portion diverging in a direction extending from said additional inlet end towards said additional outlet end.

5. The assembly defined in claim 4, further comprising an actuator lever connected to said air guide element, said ribs being disposed substantially in a common plane, said actuator lever having a knob at least partially disposed in said plane at an end of said lever opposite said air guide element, said air guide element being spaced from said plane.

6. The assembly defined in claim 1 further comprising a dashboard panel having a multiplicity of stationary ribs spaced from one another to form a grid, said housing being mounted to said dashboard panel.

7. The assembly defined in claim 6 wherein said ribs are disposed substantially in a common plane, said air guide element being spaced from said plane.

8. The assembly defined in claim 7 wherein said dashboard panel is provided with mounting means for receiving said housing, said mounting means having an additional inlet end and an additional outlet end, said mounting means having in a region about said additional outlet end a mouth portion diverging in a direction extending from said additional inlet end towards said additional outlet end.

9. The assembly defined in claim 1, further comprising an actuator lever connected to said air guide element.

10. In a ventilating system of an automotive vehicle, an assembly for adjustably controlling the direction of air flow into a passenger compartment of said vehicle, said assembly comprising:
    a housing having an air inlet end and an air outlet end, said housing defining a direction of inflowing air extending from said inlet end towards said outlet end;
    a dashboard panel having a multiplicity of stationary ribs spaced from one another to form a grid, said housing being mounted to said dashboard panel, said ribs being disposed substantially in a common plane;
    an intergral air flow guide element rotatably disposed in said housing, said guide element including a multiplicity of air deflection components rigidly connected to one another;
    coupling means for rotatably connecting said guide element to said housing, said coupling means including a ball and socket joint, said guide element being mounted to said housing in a snap lock by means of said ball and socket joint; and
    actuator means including an actuator lever connected to said air guide element and manipulatable by an operator for facilitating a pivoting of said guide element to change a direction of outflowing air at said outlet end of said housing, said actuator level having a knob at least partially disposed in said plane at an end of said lever opposite said air guide element, said air guide element being spaced from said plane.

11. The assembly defined in claim 10 wherein said housing, said guide element and said coupling means consist of synthetic resin.

* * * * *